(12) United States Patent
Jain et al.

(10) Patent No.: US 9,386,111 B2
(45) Date of Patent: Jul. 5, 2016

(54) MONITORING MEDIA EXPOSURE USING WIRELESS COMMUNICATIONS

(71) Applicant: The Nielsen Company (US), LLC, Schaumburg, IL (US)

(72) Inventors: Anand Jain, Ellicott City, MD (US); John Stavropoulos, Edison, NJ (US); Alan Neuhauser, Silver Spring, MD (US); Wendell Lynch, East Lansing, MI (US); Vladimir Kuznetsov, Ellicott City, MD (US); Jack Crystal, Owings Mills, MD (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/570,713

(22) Filed: Dec. 15, 2014

(65) Prior Publication Data

US 2015/0100692 A1   Apr. 9, 2015

Related U.S. Application Data

(63) Continuation of application No. 14/303,032, filed on Jun. 12, 2014, which is a continuation of application No. PCT/US2012/070162, filed on Dec. 17, 2012, which is a continuation of application No. 13/327,943, filed on Dec. 16, 2011, now Pat. No. 8,538,333.

(51) Int. Cl.
*H04B 7/00* (2006.01)
*H04L 29/08* (2006.01)
(Continued)

(52) U.S. Cl.
CPC .............. *H04L 67/22* (2013.01); *H04W 4/008* (2013.01); *H04W 24/08* (2013.01); *H04W 52/0245* (2013.01)

(58) Field of Classification Search
USPC ............... 455/3.01, 3.05, 3.06, 456.1, 456.5, 455/456.6, 457, 41.2, 500, 507, 509, 513, 455/514, 67.11, 67.13, 68, 69
See application file for complete search history.

(56) References Cited

U.S. PATENT DOCUMENTS 3,540,003 A    11/1970  Murphy
3,818,458 A    6/1974   Deese
(Continued)

FOREIGN PATENT DOCUMENTS

AU    2003253598    11/2003
AU    2013205736    5/2013
(Continued)

OTHER PUBLICATIONS

United States Patent and Trademark Office, "Non-Final Office Action," issued in connection with U.S. Appl. No. 14/303,032, on Aug. 14, 2014 (7 pages).
(Continued)

*Primary Examiner* — Tuan A Tran
(74) *Attorney, Agent, or Firm* — Hanley, Flight & Zimmerman, LLC

(57) ABSTRACT

Disclosed examples involve collecting a cookie at a client device based on media accessed via a web page at the client device, and selecting a portable device identifier at the client device. The portable device identifier corresponds to a closest one of a plurality of portable devices in wireless communication with the client device. The portable device identifier is associated with a particular person. In response to instructions embedded in the media, a hypertext transfer protocol (HTTP) request is sent to a server. The HTTP request includes the cookie, the portable device identifier, and information identifying exposure to the media.

21 Claims, 6 Drawing Sheets

(51) Int. Cl.
  *H04W 4/00*       (2009.01)
  *H04W 52/02*      (2009.01)
  *H04W 24/08*      (2009.01)

(56)          References Cited

U.S. PATENT DOCUMENTS

| | | |
|---|---|---|
| 3,906,450 A | 9/1975 | Prado, Jr. |
| 3,906,454 A | 9/1975 | Martin |
| 3,906,460 A | 9/1975 | Halpern |
| T955,010 I4 | 2/1977 | Ragonese et al. |
| 4,168,396 A | 9/1979 | Best |
| 4,230,990 A | 10/1980 | Lert, Jr. et al. |
| 4,232,193 A | 11/1980 | Gerard |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,450,431 A | 5/1984 | Hochstein |
| 4,558,413 A | 12/1985 | Schmidt et al. |
| 4,588,991 A | 5/1986 | Atalla |
| 4,590,550 A | 5/1986 | Eilert et al. |
| 4,595,950 A | 6/1986 | Lofberg |
| 4,600,829 A | 7/1986 | Walton |
| 4,658,093 A | 4/1987 | Hellman |
| 4,672,572 A | 6/1987 | Alsberg |
| 4,685,056 A | 8/1987 | Barnsdale, Jr. et al. |
| 4,695,879 A | 9/1987 | Weinblatt |
| 4,696,034 A | 9/1987 | Wiedemer |
| 4,703,324 A | 10/1987 | White |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,747,139 A | 5/1988 | Taaffe |
| 4,757,533 A | 7/1988 | Allen et al. |
| 4,791,565 A | 12/1988 | Dunham et al. |
| 4,803,625 A | 2/1989 | Fu et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,914,689 A | 4/1990 | Quade et al. |
| 4,926,162 A | 5/1990 | Pickell |
| 4,930,011 A | 5/1990 | Kiewit |
| 4,940,976 A | 7/1990 | Gastouniotis et al. |
| 4,956,769 A | 9/1990 | Smith |
| 4,977,594 A | 12/1990 | Shear |
| 5,023,907 A | 6/1991 | Johnson et al. |
| 5,032,979 A | 7/1991 | Hecht et al. |
| 5,086,386 A | 2/1992 | Islam |
| 5,182,770 A | 1/1993 | Medveczky et al. |
| 5,204,897 A | 4/1993 | Wyman |
| 5,233,642 A | 8/1993 | Renton |
| 5,283,734 A | 2/1994 | Von Kohorn |
| 5,287,408 A | 2/1994 | Samson |
| 5,343,239 A | 8/1994 | Lappington et al. |
| 5,355,484 A | 10/1994 | Record et al. |
| 5,374,951 A | 12/1994 | Welsh |
| 5,377,269 A | 12/1994 | Heptig et al. |
| 5,388,211 A | 2/1995 | Hornbuckle |
| 5,406,269 A | 4/1995 | Baran |
| 5,410,598 A | 4/1995 | Shear |
| 5,436,653 A | 7/1995 | Ellis et al. |
| 5,440,738 A | 8/1995 | Bowman et al. |
| 5,444,642 A | 8/1995 | Montgomery et al. |
| 5,450,134 A | 9/1995 | Legate |
| 5,450,490 A | 9/1995 | Jensen et al. |
| 5,481,294 A | 1/1996 | Thomas et al. |
| 5,483,276 A | 1/1996 | Brooks et al. |
| 5,483,658 A | 1/1996 | Grube et al. |
| 5,497,185 A | 3/1996 | Dufresne et al. |
| 5,497,479 A | 3/1996 | Hornbuckle |
| 5,499,340 A | 3/1996 | Barritz |
| 5,550,928 A | 8/1996 | Lu et al. |
| 5,579,124 A | 11/1996 | Aijala et al. |
| 5,584,050 A | 12/1996 | Lyons |
| 5,594,934 A | 1/1997 | Lu et al. |
| 5,675,510 A | 10/1997 | Coffey et al. |
| 5,737,026 A | 4/1998 | Lu et al. |
| 5,748,104 A | 5/1998 | Argyroudis et al. |
| 5,764,763 A | 6/1998 | Jensen et al. |
| 5,793,409 A | 8/1998 | Tetsumura |
| 5,796,952 A | 8/1998 | Davis et al. |
| 5,872,588 A | 2/1999 | Aras et al. |
| 5,917,425 A | 6/1999 | Crimmins et al. |
| 6,052,730 A | 4/2000 | Feliciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,164,975 A | 12/2000 | Weingarden et al. |
| 6,223,215 B1 | 4/2001 | Hunt et al. |
| 6,247,050 B1 | 6/2001 | Tso et al. |
| 6,353,929 B1 | 3/2002 | Houston |
| 6,415,323 B1 | 7/2002 | McCanne et al. |
| 6,434,614 B1 | 8/2002 | Blumenau |
| 6,460,079 B1 | 10/2002 | Blumenau |
| 6,529,952 B1 | 3/2003 | Blumenau |
| 6,539,393 B1 | 3/2003 | Kabala |
| 6,564,104 B2 | 5/2003 | Nelson et al. |
| 6,572,560 B1 | 6/2003 | Watrous et al. |
| 6,647,548 B1 | 11/2003 | Lu et al. |
| 6,661,438 B1 | 12/2003 | Shiraishi et al. |
| 6,839,680 B1 | 1/2005 | Liu et al. |
| 6,845,360 B2 | 1/2005 | Jensen et al. |
| 6,871,180 B1 | 3/2005 | Neuhauser et al. |
| 6,877,007 B1 | 4/2005 | Hentzel et al. |
| 6,893,396 B2 | 5/2005 | Schulze et al. |
| 6,990,453 B2 | 1/2006 | Wang et al. |
| 6,993,590 B1 | 1/2006 | Gauthier et al. |
| 7,038,619 B2 * | 5/2006 | Percy .................... G01S 5/0027 342/357.52 |
| 7,039,699 B1 | 5/2006 | Narin et al. |
| 7,092,926 B2 | 8/2006 | Cerrato |
| 7,102,640 B1 | 9/2006 | Aholainen et al. |
| 7,150,030 B1 | 12/2006 | Eldering et al. |
| 7,155,159 B1 | 12/2006 | Weinblatt et al. |
| 7,159,023 B2 | 1/2007 | Tufts |
| 7,181,159 B2 | 2/2007 | Breen |
| 7,181,412 B1 | 2/2007 | Fulgoni et al. |
| 7,254,406 B2 | 8/2007 | Beros et al. |
| 7,260,837 B2 | 8/2007 | Abraham et al. |
| 7,343,417 B2 | 3/2008 | Baum |
| 7,386,473 B2 | 6/2008 | Blumenau |
| 7,406,516 B2 | 7/2008 | Davis et al. |
| 7,420,464 B2 * | 9/2008 | Fitzgerald .............. G06Q 30/00 340/539.13 |
| 7,460,827 B2 | 12/2008 | Schuster et al. |
| 7,471,987 B2 | 12/2008 | Crystal et al. |
| 7,483,975 B2 | 1/2009 | Kolessar et al. |
| 7,526,538 B2 | 4/2009 | Wilson |
| 7,546,370 B1 | 6/2009 | Acharya et al. |
| 7,590,568 B2 | 9/2009 | Blumenau |
| 7,592,908 B2 * | 9/2009 | Zhang .................... G06Q 30/02 340/539.13 |
| 7,600,014 B2 | 10/2009 | Russell et al. |
| 7,613,635 B2 | 11/2009 | Blumenau |
| 7,627,477 B2 | 12/2009 | Wang et al. |
| 7,644,156 B2 | 1/2010 | Blumenau |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,770,193 B2 | 8/2010 | Lee |
| 7,788,216 B2 | 8/2010 | Li et al. |
| 7,882,242 B2 | 2/2011 | Chen |
| 7,889,686 B1 | 2/2011 | Chang |
| 7,908,133 B2 | 3/2011 | Neuhauser |
| 7,925,694 B2 | 4/2011 | Harris |
| 7,941,525 B1 | 5/2011 | Yavilevich |
| 7,949,565 B1 | 5/2011 | Eldering et al. |

(56) References Cited

U.S. PATENT DOCUMENTS

| | | |
|---|---|---|
| 7,958,234 B2 | 6/2011 | Thomas et al. |
| 7,962,603 B1 | 6/2011 | Morimoto |
| 8,023,882 B2 | 9/2011 | Croy et al. |
| 8,032,626 B1 | 10/2011 | Russell et al. |
| 8,036,600 B2 | 10/2011 | Garrett et al. |
| 8,046,255 B2 | 10/2011 | Bistriceanu et al. |
| 8,055,197 B2 † | 11/2011 | Lyu |
| 8,060,601 B1 | 11/2011 | Brown et al. |
| 8,131,861 B2 | 3/2012 | Butler et al. |
| 8,180,376 B1 | 5/2012 | Merritt |
| 8,185,351 B2 | 5/2012 | Crystal et al. |
| 8,209,434 B2 | 6/2012 | Wendelrup et al. |
| 8,225,342 B2 | 7/2012 | Mears et al. |
| 8,229,780 B2 | 7/2012 | Davidow et al. |
| 8,234,408 B2 | 7/2012 | Jungck |
| 8,266,687 B2 | 9/2012 | Baldry |
| 8,271,886 B2 | 9/2012 | Lee et al. |
| 8,302,120 B2 | 10/2012 | Ramaswamy |
| 8,307,006 B2 | 11/2012 | Hannan et al. |
| 8,326,212 B2 | 12/2012 | Ramaswamy et al. |
| 8,335,473 B2 | 12/2012 | Liao |
| 8,370,489 B2 | 2/2013 | Mazumdar et al. |
| 8,402,035 B2 * | 3/2013 | Artzt .................... G06Q 30/02 707/709 |
| 8,495,198 B2 | 7/2013 | Sim et al. |
| 8,504,411 B1 | 8/2013 | Subasic et al. |
| 8,538,333 B2 | 9/2013 | Jain et al. |
| 8,543,454 B2 | 9/2013 | Fleischman et al. |
| 8,549,552 B2 | 10/2013 | Ramaswamy et al. |
| 8,555,304 B2 | 10/2013 | Mears et al. |
| 8,572,640 B2 | 10/2013 | Kolessar |
| 8,631,122 B2 | 1/2014 | Kadam et al. |
| 8,666,303 B2 * | 3/2014 | Ramaswamy ..... G06Q 30/0201 235/380 |
| 8,688,524 B1 | 4/2014 | Ramalingam et al. |
| 8,713,168 B2 | 4/2014 | Heffernan et al. |
| 8,738,763 B2 | 5/2014 | Crystal et al. |
| 8,751,461 B2 | 6/2014 | Abraham et al. |
| 8,843,626 B2 | 9/2014 | Mazumdar et al. |
| 8,849,182 B2 | 9/2014 | Neuhauser et al. |
| 8,909,771 B2 | 12/2014 | Heath |
| 8,918,802 B2 * | 12/2014 | Ramaswamy .......... H04H 60/58 725/18 |
| 8,954,536 B2 | 2/2015 | Kalus et al. |
| 8,977,194 B2 | 3/2015 | Jain et al. |
| 9,055,122 B2 | 6/2015 | Grecco et al. |
| 9,124,920 B2 * | 9/2015 | Besehanic ........ H04N 21/25891 |
| 9,218,612 B2 | 12/2015 | Mazumdar et al. |
| 2002/0045519 A1 | 4/2002 | Watterson et al. |
| 2002/0083060 A1 | 6/2002 | Wang et al. |
| 2002/0129360 A1 | 9/2002 | Lee |
| 2002/0138848 A1 | 9/2002 | Alao et al. |
| 2002/0143577 A1 | 10/2002 | Shiffman et al. |
| 2002/0178220 A1 | 11/2002 | Smith et al. |
| 2003/0032409 A1 | 2/2003 | Hutcheson et al. |
| 2003/0037131 A1 | 2/2003 | Verma |
| 2003/0046385 A1 | 3/2003 | Vincent |
| 2003/0163831 A1 | 8/2003 | Gall et al. |
| 2003/0171833 A1 | 9/2003 | Crystal et al. |
| 2003/0177488 A1 | 9/2003 | Smith et al. |
| 2003/0220901 A1 | 11/2003 | Carr et al. |
| 2004/0005900 A1 | 1/2004 | Zilliacus |
| 2004/0010418 A1 | 1/2004 | Buonocore et al. |
| 2004/0019463 A1 | 1/2004 | Kolessar et al. |
| 2004/0058675 A1 | 3/2004 | Lu et al. |
| 2004/0088212 A1 | 5/2004 | Hill |
| 2004/0098229 A1 | 5/2004 | Error et al. |
| 2004/0109061 A1 | 6/2004 | Walker et al. |
| 2004/0203362 A1 | 10/2004 | Pattabiraman et al. |
| 2004/0252816 A1 | 12/2004 | Nicolas |
| 2005/0033657 A1 | 2/2005 | Herrington et al. |
| 2005/0120389 A1 | 6/2005 | Boss et al. |
| 2005/0166233 A1 | 7/2005 | Beyda et al. |
| 2005/0172021 A1 | 8/2005 | Brown |
| 2005/0216509 A1 | 9/2005 | Kolessar et al. |
| 2005/0223093 A1 | 10/2005 | Hanson et al. |
| 2005/0243784 A1 * | 11/2005 | Fitzgerald .............. G06Q 30/00 370/338 |
| 2006/0101116 A1 | 5/2006 | Rittman et al. |
| 2006/0168613 A1 | 7/2006 | Wood et al. |
| 2006/0178996 A1 | 8/2006 | Matsushima et al. |
| 2006/0242325 A1 | 10/2006 | Ramaswamy et al. |
| 2006/0271641 A1 | 11/2006 | Stavrakos et al. |
| 2006/0294259 A1 | 12/2006 | Matefi et al. |
| 2007/0106787 A1 | 5/2007 | Blumenau |
| 2007/0106792 A1 | 5/2007 | Blumenau |
| 2007/0156532 A1 | 7/2007 | Nyhan et al. |
| 2007/0232232 A1 | 10/2007 | Matsuo et al. |
| 2007/0237102 A1 | 10/2007 | Trott |
| 2007/0266395 A1 | 11/2007 | Lee et al. |
| 2007/0288277 A1 | 12/2007 | Neuhauser et al. |
| 2007/0288476 A1 | 12/2007 | Flanagan, III et al. |
| 2007/0294705 A1 | 12/2007 | Gopalakrishnan et al. |
| 2007/0294706 A1 | 12/2007 | Neuhauser et al. |
| 2008/0004958 A1 | 1/2008 | Ralph et al. |
| 2008/0033903 A1 | 2/2008 | Carol et al. |
| 2008/0059988 A1 | 3/2008 | Lee et al. |
| 2008/0086533 A1 | 4/2008 | Neuhauser et al. |
| 2008/0091087 A1 | 4/2008 | Neuhauser et al. |
| 2008/0109295 A1 | 5/2008 | McConochie et al. |
| 2008/0112346 A1 | 5/2008 | Tolpin et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0204273 A1 | 8/2008 | Crystal et al. |
| 2008/0235243 A1 | 9/2008 | Lee et al. |
| 2008/0243590 A1 | 10/2008 | Rich |
| 2008/0276179 A1 | 11/2008 | Borenstein et al. |
| 2009/0030780 A1 | 1/2009 | York et al. |
| 2009/0037575 A1 | 2/2009 | Crystal et al. |
| 2009/0055241 A1 | 2/2009 | Chen et al. |
| 2009/0070443 A1 | 3/2009 | Vanderhook et al. |
| 2009/0076899 A1 | 3/2009 | Gbodimowo |
| 2009/0169024 A1 | 7/2009 | Krug et al. |
| 2009/0171762 A1 | 7/2009 | Alkove et al. |
| 2009/0171767 A1 | 7/2009 | Kolessar |
| 2009/0193052 A1 | 7/2009 | Fitzgerald et al. |
| 2009/0307084 A1 | 12/2009 | Monighetti et al. |
| 2009/0327026 A1 | 12/2009 | Bistriceanu et al. |
| 2010/0004977 A1 | 1/2010 | Marci et al. |
| 2010/0010866 A1 | 1/2010 | Bal et al. |
| 2010/0070621 A1 | 3/2010 | Urdan et al. |
| 2010/0088152 A1 | 4/2010 | Bennett |
| 2010/0088373 A1 | 4/2010 | Pinkham |
| 2010/0121676 A1 | 5/2010 | Jackson |
| 2010/0153544 A1 | 6/2010 | Krassner et al. |
| 2010/0161506 A1 | 6/2010 | Bosenick et al. |
| 2010/0191723 A1 | 7/2010 | Perez et al. |
| 2010/0199296 A1 | 8/2010 | Lee et al. |
| 2010/0205057 A1 | 8/2010 | Hook et al. |
| 2010/0222087 A1 | 9/2010 | Dragt |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0269127 A1 | 10/2010 | Krug |
| 2010/0299604 A1 | 11/2010 | Blumenau |
| 2010/0312854 A1 | 12/2010 | Hyman |
| 2010/0313009 A1 | 12/2010 | Combet et al. |
| 2011/0025914 A1 | 2/2011 | Mcrae et al. |
| 2011/0028093 A1 | 2/2011 | Patel et al. |
| 2011/0087519 A1 | 4/2011 | Fordyce, III et al. |
| 2011/0087919 A1 | 4/2011 | Deshmukh et al. |
| 2011/0093327 A1 | 4/2011 | Fordyce, III et al. |
| 2011/0099142 A1 | 4/2011 | Karjalainen et al. |
| 2011/0106587 A1 | 5/2011 | Lynch et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 * | 6/2011 | Tenbrock ............... G06Q 30/02 705/7.33 |
| 2011/0153426 A1 | 6/2011 | Reddy et al. |
| 2011/0191184 A1 | 8/2011 | Blackhurst et al. |
| 2011/0191664 A1 | 8/2011 | Sheleheda et al. |

(56) References Cited

U.S. PATENT DOCUMENTS

| | | |
|---|---|---|
| 2011/0191831 A1 | 8/2011 | Chan et al. |
| 2011/0196735 A1 | 8/2011 | von Sydow et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0288907 A1 | 11/2011 | Harvey et al. |
| 2011/0295926 A1 | 12/2011 | Battiston et al. |
| 2012/0005213 A1 | 1/2012 | Hannan et al. |
| 2012/0030037 A1 | 2/2012 | Carriero |
| 2012/0063427 A1 | 3/2012 | Kandekar et al. |
| 2012/0072469 A1 | 3/2012 | Perez et al. |
| 2012/0109709 A1 | 5/2012 | Fordyce, III et al. |
| 2012/0110027 A1 | 5/2012 | Falcon |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0192214 A1 | 7/2012 | Hunn et al. |
| 2012/0215621 A1 | 8/2012 | Heffernan et al. |
| 2012/0239407 A1 | 9/2012 | Lynch et al. |
| 2012/0239809 A1 | 9/2012 | Mazumdar et al. |
| 2012/0245978 A1 | 9/2012 | Jain et al. |
| 2012/0254466 A1 | 10/2012 | Jungck |
| 2012/0278377 A1 | 11/2012 | Weissman et al. |
| 2012/0300944 A1 | 11/2012 | Spittle |
| 2012/0310729 A1 | 12/2012 | Dalto et al. |
| 2012/0311017 A1 | 12/2012 | Sze et al. |
| 2013/0014144 A1 | 1/2013 | Bhatia et al. |
| 2013/0014153 A1 † | 1/2013 | Bhatia |
| 2013/0046615 A1 | 2/2013 | Liyanage |
| 2013/0097312 A1 | 4/2013 | Mazumdar et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0157563 A1 | 6/2013 | Jain et al. |
| 2013/0157568 A1 | 6/2013 | Jain et al. |
| 2013/0159499 A1 | 6/2013 | Besehanic |
| 2013/0212188 A1 | 8/2013 | Duterque et al. |
| 2013/0246389 A1 | 9/2013 | Osann, Jr. |
| 2013/0246609 A1 | 9/2013 | Topchy et al. |
| 2013/0282898 A1 | 10/2013 | Kalus et al. |
| 2013/0297411 A1 | 11/2013 | Van Datta et al. |
| 2014/0033317 A1 | 1/2014 | Barber |
| 2014/0113557 A1 | 4/2014 | Jain et al. |
| 2014/0187268 A1 | 7/2014 | Browne et al. |
| 2014/0229232 A1 | 8/2014 | Crystal et al. |
| 2014/0295764 A1 | 10/2014 | Jain et al. |
| 2015/0019322 A1 | 1/2015 | Alla et al. |
| 2015/0019327 A1 | 1/2015 | Mazumdar et al. |
| 2015/0173117 A1 | 6/2015 | Jain et al. |

FOREIGN PATENT DOCUMENTS

| | | |
|---|---|---|
| CN | 1653754 | 8/2005 |
| CN | 1898662 | 1/2007 |
| CN | 101077014 | 11/2007 |
| EP | 0231427 | 8/1987 |
| EP | 0325219 | 7/1989 |
| EP | 0703683 | 3/1996 |
| EP | 0744695 | 11/1996 |
| EP | 1133090 | 9/2001 |
| EP | 1213860 | 6/2002 |
| GB | 2176639 | 12/1986 |
| JP | H05324352 | 12/1993 |
| JP | 2001209881 | 8/2001 |
| JP | 2001282982 | 10/2001 |
| JP | 2002-091852 | 3/2002 |
| JP | 2002163562 | 6/2002 |
| JP | 2002373152 | 12/2002 |
| JP | 2004222129 | 8/2004 |
| JP | 2005520393 | 7/2005 |
| JP | 2006127320 | 5/2006 |
| JP | 2006127321 | 5/2006 |
| JP | 2006260275 | 9/2006 |
| JP | 2010-501939 | 1/2010 |
| JP | 2010039845 | 2/2010 |
| KR | 20020037980 | 5/2002 |
| KR | 20110023293 | 3/2011 |
| WO | 9504430 | 2/1995 |
| WO | WO9600950 | 1/1996 |
| WO | WO9617467 | 6/1996 |
| WO | WO9628904 | 9/1996 |
| WO | WO9632815 | 10/1996 |
| WO | WO9637983 | 11/1996 |
| WO | WO9641495 | 12/1996 |
| WO | 9810539 | 3/1998 |
| WO | 9933206 | 7/1999 |
| WO | WO0041115 | 7/2000 |
| WO | WO0152168 | 7/2001 |
| WO | 02/11123 | 2/2002 |
| WO | 03077455 | 9/2003 |
| WO | 03/091990 | 11/2003 |
| WO | 03095945 | 11/2003 |
| WO | WO2005013072 | 2/2005 |
| WO | 2005071961 | 8/2005 |
| WO | 2006037014 | 4/2006 |
| WO | WO2010088372 | 8/2010 |
| WO | WO2010104285 | 9/2010 |
| WO | 2011/080707 | 7/2011 |
| WO | WO2011097624 | 8/2011 |
| WO | WO2012040371 | 3/2012 |
| WO | WO2012087954 | 6/2012 |
| WO | WO2012128895 | 9/2012 |
| WO | 2013/090916 | 6/2013 |
| WO | WO2013122907 | 8/2013 |
| WO | WO2014059319 | 4/2014 |
| ZA | 20048525 | 3/2006 |

OTHER PUBLICATIONS

United States Patent and Trademark Office, "Notice of Allowance," issued in connection with U.S. Appl. No. 13/327,943, on May 21, 2013 (10 pages).

Patent Cooperation Treaty, "International Search Report," issued in connection with International Patent Application No. PCT/US12/70162, on Mar. 4, 2013 (2 pages).

Patent Cooperation Treaty, "Written Opinion of the International Searching Authority," issued in connection with International Patent Application No. PCT/US12/70162, on Mar. 4, 2013 (4 pages).

Patent Cooperation Treaty, "International Preliminary Report on Patentability," issued in connection with International Patent Application No. PCT/US12/70162, on Jun. 17, 2014 (3 pages).

Adam et al., "Privacy Preserving Integration of Health Care Data," AMIA 2007 Symposium Proceedings, 6 pages.

Australian Government, IP Australia, "Examination Report," issued in connection with application No. AU 2012231667, on Mar. 18, 2014, 2 pages.

Australian Government, IP Australia, "Examination Report," issued in connection with application No. AU 2013205736, on Jun. 18, 2013, 2 pages.

Chloe Albanesius, Facebook Issues Fix for Several Tracking Cookies, internet article, www.pcmag.com, Sep. 28, 2011, 2 pages.

Emil Protalinski, Facebook denies cookie tracking allegations, internet article, www.zdnet.com, Sep. 25, 2011, 2 pages.

Emil Protalinski, Facebook fixes cookie behavior after logging out, internet article, www.zdnet.com, Sep. 27, 2011, 2 pages.

Emil Protalinski, US congressmen ask FTC to investigate Facebook cookies, internet article, www.zdnet.com, Sep. 28, 2011, 2 pages.

Fliptop, "Fliptop Person API Documentation," https://developer.fliptop.com/documentation, retrieved on May 7, 2013 (6 pages).

Fliptop, "Get, Keep and Grow Customers with Fliptop's Customer Intelligence Application," www.fliptop.com/features#social matching, retrieved on May 7, 2013 (3 pages).

Fliptop, "What is Fliptop?", www.fliptop.com/about_us, retrieved on May 7, 2013 (1 page).

(56) References Cited

OTHER PUBLICATIONS

International Bureau, "International Preliminary Report on Patentability," issued in connection with PCT application Serial No. PCT/US2011/052623, issued Mar. 26, 2013 (5 pages).
International Searching Authority, "International Preliminary Report on Patentability," issued in connection with application No. PCT/US2012/026760, on Sep. 24, 2013 (4 pages).
International Searching Authority, "International Search Report," issued in connection with application No. PCT/US2011/052623, mailed on Mar. 8, 2012 (3 pages).
International Searching Authority, "International Search Report," issued in connection with application No. PCT/US2012/026760, mailed on Jan. 2, 2013 (3 pages).
International Searching Authority, "International Search Report," issued in connection with International Application No. PCT/US2013/025687 on Jun. 2, 2013, 5 pages.
International Searching Authority, "Written Opinion of the International Searching Authority," issued in issued in connection with International Application No. PCT/US2013/025687 on Jun. 2, 2013, 5 pages.
International Searching Authority, "Written Opinion," issued in connection with application No. PCT/US2011/052623, mailed on Mar. 8, 2012 (4 pages).
International Searching Authority, "Written Opinion," issued in connection with application No. PCT/US2012/026760, mailed on Jan. 2, 2013 (3 pages).
JavaScript and AJAX Forum, Sep. 28, 2005, [retrieved from Internet at http://www.webmasterworld.com/forum9l/4465.htm on Jun. 29, 2011] 4 pages.
Launder, "Media Journal: Nielsen to Test Online-TV Viewing Tool," The Wall Street Journal, Apr. 30, 2013, 2 pages.
Mental Poker, Wikipedia, Jan. 12, 2010, [retrieved from Internet at http://en.wikipedia.org/wiki/Mental_poker on Sep. 21, 2010] 5 pages.
Nielsen Unveils New Online Advertising Measurement, The Nielsen Company, Sep. 27, 2010, [retrieved from Internet at http://nielsen.com/us/en/insights/press-room/2010/nielsen_unveils_newonlineadvertisingmeasurement.html on May 31, 2012] 3 pages.
Nik Cubrilovic, Logging out of Facebook is not enough, internet article, www.nikcub.appspot.com, Sep. 25, 2011, 3 pages.
Rainier, Maria, "Why Businesses Should Use Google Plus," The Social Media Guide, thesocialmediaguide.com/social_media/why-businesses-should-use-google-plus, retrieved on May 7, 2013 (9 pages).
Rapleaf, "Fast. Simple. Secure," www.rapleaf.com/why-rapleaf/, retrieved on May 7, 2013 (3 pages).
Rapleaf, "Frequently Asked Questions," www.rapleaf.com/about-us/faq/#where, retrieved on May 7, 2013 (3 pages).
Rapleaf, "The Consumer Data Marketplace," www.rapleaf.com/under-the-hood/, retrieved on May 7, 2013 (2 pages).
Sharma, "Nielsen Gets Digital to Track Online TV Viewers," all Things, Apr. 30, 2013, 3 pages.
Steve Coffey, "Internet Audience Measurement: A Practitioner's View," Journal of Interactive Advertising, vol. 1, No. 2, Spring 2001, pp. 10-17.
United States Patent and Trademark Office, "Non-Final Office Action," issued in connection with U.S. Appl. No. 13/239,005, on Jun. 4, 2013 (28 pages).
United States Patent and Trademark Office, "Non-Final Office Action," issued in connection with U.S. Appl. No. 13/691,175, on Sep. 9, 2013 (7 pages).
United States Patent and Trademark Office, "Notice of allowance," issued in connection with U.S. Appl. No. 13/239,005, on Nov. 27, 2013, 46 pages.
United States Patent and Trademark Office, "Notice of allowance," issued in connection with U.S. Appl. No. 13/513,148, on Nov. 5, 2012 (27 pages).
United States Patent and Trademark Office, "Notice of allowance," issued in connection with U.S. Appl. No. 13/691,175, on Jan. 27, 2014, 5 pages.
United States Patent and Trademark Office, "Notice of allowance," issued in connection with U.S. Appl. No. 13/691,175, on May 9, 2014, 5 pages.
Vega, Tanzina, "Nielsen Introduces New Ad Measurement Product," The New York Times, Sep. 27, 2010 (7 pages).
Vranica, "Nielsen Testing a New Web-Ad Metric," The Wall Street Journal, Sep. 23, 2010, 2 pages.
United States Patent and Trademark Office, "Non-Final Office Action," issued in connection with U.S. Appl. No. 13/756,493, on Jan. 17, 2014, 32 pages.
Japan Patent Office, "Notice of Reasons for Rejection," issued in connection with Application No. 2013-529435, Aug. 20, 2013, 4 pages.
United States Patent and Trademark Office, "Non-Final Office Action," issued in connection with U.S. Appl. No. 13/396,071, May 9, 2014, 14 pages.
United States Patent and Trademark Office, "Notice of allowance," issued in connection with U.S. Appl. No. 13/756,493, on May 20, 2014, 12 pages.
Canadian Intellectual Property Office, "Examination Search Report," issued in connection with Application No. 2,810,541 on Jan. 20, 2015, 3 pages.
The State Intellectual Property Office of China, "First Notification of Office Action," issued in connection with Application No. 201180045957.2, on Nov. 15, 2014 (20 pages).
Japanese Patent Office, "Final Rejection," issed in connection with Japanese Patent Application No. P2014-005867 on Aug. 26, 2014, (8 pages).
Japanese Patent Office, "Notice of Reasons for Rejection," issued in connection with Japanese Patent Application No. P2014-005867 on Feb. 17, 2015, (6 pages).
Japanenese Patent Office, "Notice of Reasons for Rejection," issued in connection with Japanese Patenet Application No. P2014-005867 on Apr. 15, 2014, (10 pages).
Australian Government, IP Australia, "Patent Examination Report No. 1," issued in connection with Australian Patent Application No. 2013203898, Nov. 27, 2014 (4 pages).
Australian Government, IP Australia, "Patent Examination Report No. 1," issued in connection with application No. 2011305429 on Apr. 17, 2014 (4 pages).
United States Patent and Trademark Office, "Notice of allowance," issued in connection with U.S. Appl. No. 13/690,915, on Jun. 24, 2014 (6 pages).
United States Patent and Trademark Office, "Supplemental Notice of allowability," issued in connection with U.S. Appl. No. 13/690,915, on Jul. 8, 2014 (3 pages).
United States Patent and Trademark Office, "Corrected Notice of allowability," issued in connection with U.S. Appl. No. 13/690,915, on Nov. 6, 2014 (2 pages).
United States Patent and Trademark Office, "Notice of allowance," issued in connection with U.S. Appl. No. 13/690,915, on Jun. 5, 2015, (6 pages).
Japanese Patent Office, "Notice of allowance," issued in connection with Japanese Patent Application No. 2014-005867 on Jun. 9, 2015 (3 pages).
Australian Government, IP Australia, "Notice of Acceptance," issued in connection with Application No. 2013203898, Jun. 17, 2015 (2 pages).
Australian Government, IP Australia, "Notice of Acceptance," issued in connection with Application No. 2011305429, Jul. 15, 2015 (2 pages).
United States Patent and Trademark Office, "Non-Final Office Action," issued in connection with U.S. Appl. No. 14/500,297, Jan. 5, 2015, 48 pages.
United States Patent and Trademark Office, "Notice of allowance," issued in connection with U.S. Appl. No. 14/500,297, May 21, 2015, 5 pages.
Japanese Patent Office, "Notice of Reasons for Rejection," issued in Application No. 2014-262891, Jan. 12, 2016, 3 pages.
State Intellectual Property Office of China, "Second Office Action," issued in connection with Chinese Patent Application No. 201180045957.2, on Jul. 29, 2015 (7 pages).

(56) References Cited

OTHER PUBLICATIONS

European Patent Office, "Extended Search Report," issued in connection with European Patent Application No. 12857984.4, mailed Jul. 3, 2015 (6 pages).
Intellectual Property Corporation of Malaysia, "Substantive Examination Adverse Report and Search Report," issued in connection with Malaysian Patent Application No. PI20080006, mailed Dec. 31, 2008 (3 pages).
Intellectual Property Corporation of Malaysia, "Substantive Examination Adverse Report and Search Report," issued in connection with Malaysian Patent Application No. PI20031501, mailed Aug. 14, 2009 (3 pages).
European Patent Office, "Supplementary European Search Report," issued in connection with European Patent Application No. 03750041.0, mailed Oct. 19, 2010 (3 pages).
European Patent Office, "Communication Pursuant to Article 94(3) EPC," issued in connection with European Patent Application No. 03750041.0, mailed Apr. 11, 2011 (7 pages).
State Intellectual Property Office of China, "Text of the Third Office Action," issued in connection with Chinese Patent Application No. 2007101398497, mailed Aug. 3, 2012 (6 pages).
State Intellectual Property Office of China, "Text of the Second Office Action," issued in connection with Chinese Patent Application No. 2007101398497 mailed Nov. 30, 2011 (1 page).
State Intellectual Property Office of China, "Text of the First Office Action," issued in connection with Chinese Patent Application No. 2007101398497 mailed Mar. 13, 2009 (1 page).
State Intellectual Property Office of China, "Text of the First Office Action," issued in connection with Chinese Patent Application No. 038090759 mailed Sep. 7, 2007 (3 pages).
Mexico Patent Office, "Official Action with English Translation," issued in connection with Mexican Patent Application No. MX/a/2007/012204, mailed Jun. 8, 2010 (4 pages).
State Intellectual Property Office of China, "Text of the Notification of Reexamination," issued in connection with Chinese Patent Application No. 03809075.9, mailed Jul. 19, 2011 (7 pages).
State Intellectual Property Office of China, "Rejection Decision," issued in connection with Chinese Patent Application No. 03809075.9, on Jan. 15, 2010 (11 pages).
Korean Intellectual Property Office, "Notice of Preliminary Rejection," issued in connection with Korean Patent Application No. 10-2004-7017055, mailed Nov. 30, 2009 (6 pages).
Government of India Patent Office, "First Examination Report," issued in connection with application No. 2346/CHENP/2004, on Aug. 9, 2010 (2 pages).
Canadian Intellectual Property Office, "Examiner's Report," issued in connection with application No. 2,483,042, on Jun. 15, 2010 (8 pages).
Canadian Intellectual Property Office, "Examiner's Report," issued in connection with Canadian Patent Application No. 2,483,042, mailed Oct. 11, 2011 (5 pages).
International Preliminary Examining Authority, "International Preliminary Examination Report," issued in connection with International Patent Application No. PCT/US03/12371, issued Feb. 22, 2005 (29 pages).
Intellectual Property Office of New Zealand, "Examination Report," issued in connection with New Zealand Patent Application No. 556380, mailed Jul. 13, 2007 (1 page).
Mexico Patent Office, "English Summary of Office Action," issued in connection with Mexican Patent Application No. PA/a/2004/010349, mailed Jun. 6, 2007 (2 pages).
Canadian Intellectual Property Office, "Examiner's Report," issued in connection with Canadian Patent Application No. 2,483,042, mailed May 14, 2013 (5 pages).
European Patent Office, "Extended European Search Report", issued in connection with European Patent Application No. 13002091.0 mailed Dec. 11, 2013 (9 pages).
United States Patent and Trademark Office, "Notice of Allowance", issued in connection with U.S. Appl. No. 13/526,415, mailed Jun. 10, 2013 (15 pages).
Canadian Intellectual Property Office, "Examiner's Report," issued in connection with Canadian Patent Application No. 2,483,042, mailed Jun. 9, 2014 (2 pages).
United States Patent and Trademark Office, "Restriction Requirement," issued in connection with U.S. Appl. No. 10/970,585, mailed Apr. 16, 2008 (6 pages).
United States Patent and Trademark Office, "Restriction Requirement," issued in connection with U.S. Appl. No. 10/970,585, mailed Aug. 21, 2008 (9 pages).
United States Patent and Trademark Office, "Non-Final Office Action," issued in connection with U.S. Appl. No. 10/970,585, mailed Oct. 29, 2008 (12 pages).
United States Patent and Trademark Office, "Final Office Action," issued in connection with U.S. Appl. No. 10/970,585, mailed Jun. 4, 2009 (13 pages).
United States Patent and Trademark Office, "Office Action," issued in connection with U.S. Appl. No. 10/970,585, mailed Oct. 27, 2009 (12 pages).
United States Patent and Trademark Office, "Final Office Action," issued in connection with U.S. Appl. No. 10/970,585, mailed May 10, 2010 (13 pages).
United States Patent and Trademark Office, "Non-Final Office Action," issued in connection with U.S. Appl. No. 10/970,585, mailed Dec. 29, 2010 (17 pages).
United States Patent and Trademark Office, "Non-Final Office Action," issued in connection with U.S. Appl. No. 10/970,585, mailed Aug. 18, 2011 (9 pages).
United States Patent and Trademark Office, "Notice of Allowance," issued in connection with U.S. Appl. No. 10/970,585, mailed Mar. 16, 2012 (8 pages).
IP Australia, "Patent Examination Report 3," issued in connection with Austrailian Patent Application No. 2007316392, mailed Mar. 4, 2013 (4 pages).
European Patent Office, "Communication Pursuant to Article 94(3) EPC," issued in connection with European Patent Application No. 07844943.6, mailed Aug. 12, 2013 (7 pages).
European Patent Office, "Extended European Search Report," issued in connection with European Patent Application No. 07844943.6, mailed Dec. 30, 2010 (10 pages).
Walker, "Audio Watermarking," R&D White Paper, WHP 057, BBC Research and Development, Aug. 31, 2004 (18 pages).
European Patent Office, "Communication Pursuant to Article 94(3) EPC," issued in connection with European Patent Application No. 07844943.6, mailed Dec. 8, 2011 (5 pages).
State Intellectual Property Office of China, "First Office Action," issued in connection with Chinese Patent Application No. 200780047653.3, mailed Aug. 27, 2010 (8 pages).
State Intellectual Property Office of China, "Second Office Action," issued in connection with Chinese Patent Application No. 200780047653.3, mailed Jul. 20, 2011 (9 pages).
Israel Patent Office, "Office Action" with English summary, issued in connection with Israel Patent Application No. 198525, mailed Nov. 22, 2012 (4 pages).
Japan Patent Office, "Notification of Reasons for Refusal," issued in connection with Japanese Patent Application No. 2009-536460, mailed Jun. 12, 2012 (5 pages).
Japan Patent Office, "Notification of Reasons for Refusal," issued in connection with Japanese Patent Application No. 2009-536460, mailed Jun. 18, 2013 (10 pages).
Korean Intellectual Property Office, "KIPO's Notice of Preliminary Rejection," issued in connection with Korean Patent Application No. 10-2009-7011445, mailed Dec. 12, 2013 (10 pages).
Mexico Patent Office, "Summary of Office Action," in connection with Mexican Patent Application No. MX/a/2009/004889, mailed Jul. 1, 2013 (2 pages).
International Bureau, "International Preliminary Report on Patentability," issued in connection with International Patent Application No. PCT/US2007/083940, issued May 12, 2009 (4 pages).
International Searching Authority, "Written Opinion of the International Searching Authority," issued in connection with International Patent Application No. PCT/US2007/083940, mailed Apr. 16, 2008 (3 pages).

(56) References Cited

OTHER PUBLICATIONS

International Searching Authority, "International Search Report," issued in connection with International Patent Application No. PCT/US2007/083940, mailed Apr. 16, 2008 (1 page).
IP Australia, "Patent Examination Report 1," issued in connection with Australian Patent Application No. 2007316392, mailed Sep. 10, 2012 (3 pages).
IP Australia, "Patent Examination Report 2," issued in connection with Australian Patent Application No. 2007316392, mailed Jan. 2, 2013 (3 pages).
Japan Patent Office, "Final Rejection," issued in connection with Japanese Patent Application No. P2009-536460, mailed Jan. 28, 2014 (5 pages).
United States Patent and Trademark Office, "Non-Final Office Action," issued in connection with U.S. Appl. No. 11/935,788, mailed Sep. 17, 2009 (10 pages).
United States Patent and Trademark Office, "Final Office Action," issued in connection with U.S. Appl. No. 11/935,788, mailed May 24, 2010 (13 pages).
United States Patent and Trademark Office, "Non-Final Office Action," issued in connection with U.S. Appl. No. 11/935,788, mailed Nov. 3, 2010 (21 pages).
United States Patent and Trademark Office, "Final Office Action," issued in connection with U.S. Appl. No. 11/935,788, mailed May 11, 2011 (20 pages).
United States Patent and Trademark Office, "Non-Final Office Action," issued in connection with U.S. Appl. No. 11/935,788, mailed Sep. 16, 2011 (23 pages).
United States Patent and Trademark Office, "Final Office Action," issued in connection with U.S. Appl. No. 11/935,788, mailed May 9, 2012 (22 pages).
United States Patent and Trademark Office, "Non-Final Office Action," issued in connection with U.S. Appl. No. 11/935,788, mailed Mar. 4, 2013 (21 pages).
United States Patent and Trademark Office, "Notice of Allowance," issued in connection with U.S. Appl. No. 11/935,788, mailed Oct. 4, 2013 (13 pages).
United States Patent and Trademark Office, "Notice of Allowance," issued in connection with U.S. Appl. No. 11/935,788, on Jan. 15, 2014 (6 pages).
Complaint, *Arbitron Inc.*, v. *John Barrett Kiefl* in United States District Court for the Southern District of New York, Apr. 22, 2009, Case 1:09-cv-04013-PAC, (12 pages).
Macera, John S. to Michael Skarzynski, regarding Alleged Patent Infringement, Exhibit 1 of the Apr. 22, 2009 Complaint in *Arbitron Inc.*, v. *John Barrett Kiefl*, United States District Court for the Souther District of New York, Case 1:09-cv-04013-PAC, Apr. 8, 2009 (8 pages).
Drucker, Lawrence C. to John S. Macera, regarding Alleged Patent Infringement, Apr. 23, 2009 (2 pages).
IP Australia, "Notice of Acceptance," issued in connection with Australian Patent Application No. 2007316392, mailed May 15, 2014 (2 pages).
Korean Intellectual Property Office, "KIPO's Notice of Last Preminary Rejection (English Translation)," issued in connection with Korean Patent Application No. 10-2009-7011445, mailed Jun. 10, 2014 (9 pages).
Canadian Intellectual Property Office, "Examiner's Report," issued in connection with Canadian Patent Application No. 2,669,133, mailed Jun. 16, 2014 (2 pages).
Israel Patent Office, "Office Action" with redacted translation, issued in connection with Israel Patent Application No. 198525, mailed Jun. 18, 2014 (3 pages).
Canadian Intellectual Property Office, "Examiner's Report", issued in connection with Canadian Patent Application No. 2,647,892, mailed Nov. 13, 2014 (4 pages).
European Patent Office, "Communication Pursuant to Article 94(3) EPC," issued in connection with European Patent Application No. 03750041.0, mailed Jan. 14, 2015 (5 pages).

United States Patent and Trademark Office, "Notice of Allowance", issued in connection with U.S. Appl. No. 14/733,651, mailed Jul. 6, 2015 (7 pages).
Want et al., "Bridging Physical and Virtual Worlds with Electronic Tags," CHI'99, ACM Press, Apr. 1999 (8 pages).
Timo, "iPhone RFID: Object Based Media," Touch, Apr. 14, 2009, retrieved from <http://www.nearfield.org/2009/04/iphone-rfid-nfc>, retrieved on Jul. 27, 2015 (12 pages).
European Patent Office, "Extended European Search Report," in connection with European Patent No. 12858408.3, mailed Jul. 7, 2015 (8 pages).
Bluetooth, "Simple Pairing Whitepaper," retrieved from <http:archive.org/web/20061018032605>, Aug. 3, 2006 (24 pages).
United States Patent and Trademark Office, "Advisory Action," issued in connection with U.S. Appl. No. 11/935,788, mailed Aug. 30, 2012 (3 pages).
European Patent Office, "Communication Pursuant to Rules 70(2) and 70a(2) EPC," in connection with European Patent No. 12858408.3, mailed Jul. 24, 2015 (1 page).
United States Patent and Trademark Office, "Notice of Allowance", issued in connection with U.S. Appl. No. 14/629,025, mailed Oct. 6, 2015 (9 pages).
European Patent Office, "Communication Pursuant to Rules 70(2) and 70a(2) EPC," in connection with European Patent No. 12857984.4, mailed Jul. 21, 2015 (1 page).
International Searching Authority, "International Search Report and Written Opinion," issued in connection with International Patent Application No. PCT/US12/70163, mailed Feb. 25, 2013 (6 pages).
United States Patent and Trademark Office, "Final Office Action," issued in connection with U.S. Appl. No. 13/327,993, mailed Feb. 25, 2014 (8 pages).
United States Patent and Trademark Office, "Non-Final Office Action," issued in connection with U.S. Appl. No. 13/327,993, mailed Jun. 7, 2013 (5 pages).
United States Patent and Trademark Office, "Notice of Allowance," issued in connection with U.S. Appl. No. 13/327,993, mailed Jul. 11, 2014 (5 pages).
United States Patent and Trademark Office, "Final Office Action," issued in connection with U.S. Appl. No. 14/047,971, mailed Jul. 24, 2015 (10 pages).
United States Patent and Trademark Office, "Non-Final Office Action," issued in connection with U.S. Appl. No. 14/047,971, mailed Jan. 28, 2015 (10 pages).
United States Patent and Trademark Office, "Non-Final Office Action," issued in connection with U.S. Appl. No. 14/253,646, mailed Aug. 3, 2015 (6 pages).
State Intellectual Property Office of China, "First Notification of Office Action," issued in connection with Chinese Patent Application No. 201280069886.4 mailed Apr. 22, 2015 (20 pages).
United States Patent and Trademark Office, "Notice of Allowance," issued in connection with U.S. Appl. No. 13/327,993, mailed Oct. 24, 2014 (7 pages).
United States Patent and Trademark Office, "Notice of Allowance," issued in connection with U.S. Appl. No. 14/303,032, mailed Aug. 14, 2015 (5 pages).
United States Patent and Trademark Office, "Final Office Action," issued in connection with U.S. Appl. No. 14/303,032, mailed Mar. 17, 2015 (7 pages).
United States Patent and Trademark Office, "Notice of Allowance," issued in connection with U.S. Appl. No. 14/303,032, mailed Dec. 10, 2015 (7 pages).
State Intellectual Property Office of China, "First Notification of Office Action," issued in connection with Chinese Patent Application No. 201280069618.2 mailed Jan. 4, 2016 (16 pages).
State Intellectual Property Office of China, "Search Report," issued in connection with Chinese Patent Application No. 201280069618.2 mailed Jan. 4, 2016 (4 pages).
State Intellectual Property Office of China, "Examination Report," issued in connection with Chinese Patent Application No. 201280069886.4, mailed Mar. 4, 2016 (5 pages).

\* cited by examiner
† cited by third party

| COMP1 | Media1 | Media2 | Media3 | Media4 | Media5 |
|---|---|---|---|---|---|
| Device 1 | 000 | 020 | 000 | 000 | 000 |
| Device 2 | 127 | 080 | 022 | 000 | 124 |
| Device 3 | 063 | 100 | 110 | 000 | 000 |
| Device 4 | 000 | 000 | 064 | 127 | 000 | time ⟶

FIG. 6

MONITORING MEDIA EXPOSURE USING WIRELESS COMMUNICATIONS

RELATED APPLICATIONS

This patent arises from a continuation of U.S. patent application Ser. No. 14/303,032, filed Jun. 12, 2014, which is a continuation of International Patent Application No. PCT/US12/70162, filed Dec. 17, 2012, which claims the benefit of U.S. patent application Ser. No. 13/327,943, filed Dec. 16, 2011, now U.S. Pat. No. 8,538,333, all of which are hereby incorporated herein by reference in their entireties.

TECHNICAL FIELD

The present disclosure is directed to processor-based audience analytics. More specifically, the disclosure describes systems and methods for combining characteristics of Bluetooth signals with research data to identify and characterize devices and their accompanying users associated with media consumption.

BACKGROUND INFORMATION

Bluetooth is a proprietary open wireless technology standard for exchanging data over short distances from fixed and mobile devices, creating personal area networks (PANs) with high levels of security. Bluetooth uses a radio technology called frequency-hopping spread spectrum, which divides the data being sent and transmits portions of it on up to 79 bands (1 MHz each, preferably centered from 2402 to 2480 MHz) in the range 2,400-2,483.5 MHz (allowing for guard bands). This range is in the globally unlicensed Industrial, Scientific and Medical (ISM) 2.4 GHz short-range radio frequency band. Gaussian frequency-shift keying (GFSK) modulation may be used, however, more advanced techniques, such as $\pi/4$-DQPSK and 8DPSK modulation may also be used between compatible devices. Devices functioning with GFSK are said to be operating in "basic rate" (BR) mode where an instantaneous data rate of 1 Mbit/s is possible. "Enhanced Data Rate" (EDR) is used to describe $\pi/4$-DPSK and 8DPSK schemes, each giving 2 and 3 Mbit/s respectively. The combination of these (BR and EDR) modes in Bluetooth radio technology is classified as a "BR/EDR radio".

Bluetooth is a packet-based protocol with a master-slave structure. One master may communicate with up to 7 slaves in a piconet, where all devices preferably share the master's clock. Packet exchange is based on the basic clock, defined by the master, which may tick at 312.5 µs intervals. In the simple example of single-slot packets, the master transmits in even slots and receives in odd slots; the slave, conversely, receives in even slots and transmits in odd slots. Packets may be 1, 3 or 5 slots long but in all cases the master transmit will begin in even slots and the slave transmit in odd slots.

Bluetooth provides a secure way to connect and exchange information between devices such as faxes, mobile phones, telephones, laptops, personal computers, printers, Global Positioning System (GPS) receivers, digital cameras, and video game consoles. At any given time, data can be transferred between the master and one other device. The master may choose which slave device to address and may switch rapidly from one device to another in a round-robin fashion. In the area of computer processors, Bluetooth is commonly used to operationally link devices to the computer processor. In other cases, Bluetooth signals are used to "unlock" a computer processor when an enabled device is within a certain proximity.

One area where improvements are needed is in the area of media exposure tracking and web analytics. To date, Bluetooth has been relatively underutilized in this area. What is needed are methods, systems and apparatuses for utilizing Bluetooth signal characteristics in conjunction with media exposure data to produce research data that accurately identifies and characterizes devices, and their accompanying users.

SUMMARY

Accordingly, apparatuses, systems and methods are disclosed for computer-implemented techniques for establishing media data exposure for a computer processing device, where media data is received in the computer processing device, which pairs itself with a plurality of portable computing devices (e.g., smart phone, PPM™, tablet, laptop, etc.) using a Bluetooth connection when media data is received. A signal strength characteristic of the Bluetooth connection is established in the computer processing device for each of the paired plurality of portable computing devices. Each signal strength characteristic is then associated with the received media data to determine which signal strength characteristic is the strongest when the media data was received in the computer processing device. The exposure data comprises at least one of a cookie, a logfile and a page tag, while the media data comprises at least one of audio, video, audio/video, text, an image, a web page and streaming media. The signal strength characteristic of the Blue tooth connection comprises at least one of a Received Signal Strength Indicator (RSSI) value, a Transmit Power Level (TPL) value and a Link Quality (LQ) value.

Under another embodiment, apparatuses, systems and methods are disclosed for computer-implemented techniques for establishing media data exposure for a computer processing device. Media exposure data is stored relating to media data received in the computer processing device, as well as pairing data of the computer processing device with a plurality of portable computing devices using a Bluetooth connection when media data is received. A signal strength characteristic of the Bluetooth connection is received for each of the paired plurality of portable computing devices and each signal strength characteristic is associated with the received media data to determine which signal strength characteristic is the strongest when the media data was received in the computer processing device. The strongest signal strength characteristic then associated with the media exposure data. The exposure data comprises at least one of a cookie, a logfile and a page tag, while the media data comprises at least one of audio, video, audio/video, text, an image, a web page and streaming media. The signal strength characteristic of the Bluetooth connection comprises at least one of a Received Signal Strength Indicator (RSSI) value, a Transmit Power Level (TPL) value and a Link Quality (LQ) value.

BRIEF DESCRIPTION OF THE DRAWINGS

The present invention is illustrated by way of example and not limitation in the figures of the accompanying drawings, in which like references indicate similar elements and in which:

FIG. 6 illustrates an exemplary media exposure table for a plurality of media data that was exposed to one or more of a plurality of devices.

DETAILED DESCRIPTION

Figure 1:
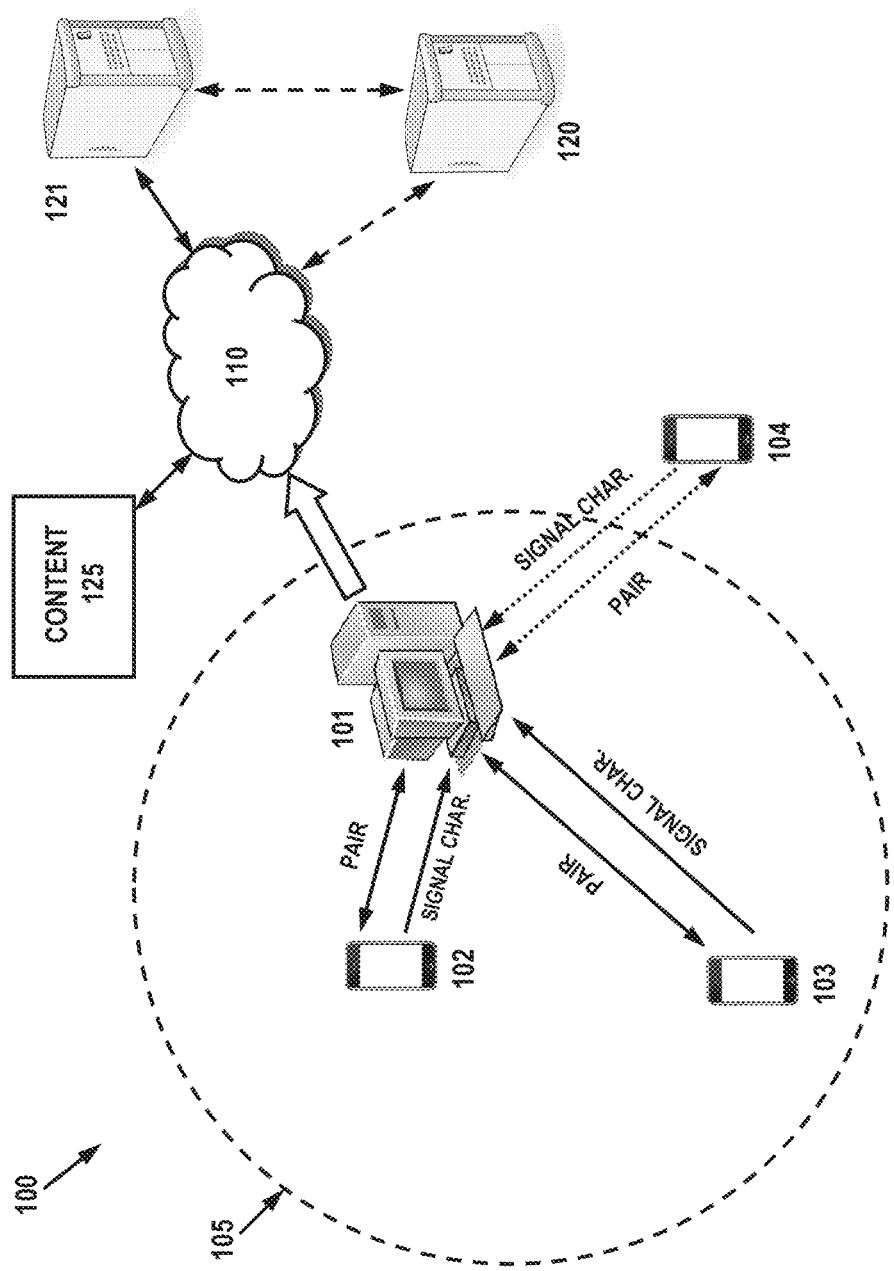
FIG. 1 illustrates an exemplary system under one embodiment, where media data is provided from a network to a processing device in the vicinity of a plurality of portable devices.

FIG. 1 illustrates an exemplary system 100 that comprises a computer processing device 101 and a plurality of portable computing devices (102-104) that are in the vicinity of processing device 101. In this example, processing device 101 is illustrated as a personal computer, while portable computing devices 102-104 are illustrated as Bluetooth-enabled cell phones. It is understood by those skilled in the art that other similar devices may be used as well. For example, processing device 101 may also be a laptop, a computer tablet, a set-top box, a media player, a network-enabled television or DVD player, and the like. Portable computing devices 102-104 may also be laptops, PDAs, tablet computers, Personal People Meters™ (PPMs), wireless telephone, etc.

Under a preferred embodiment, processing device 101 connects to content source 125 via network 110 to obtain media data. The terms "media data" and "media" as used herein mean data which is widely accessible, whether over-the-air, or via cable, satellite, network, internetwork (including the Internet), displayed, distributed on storage media, or by any other means or technique that is humanly perceptible, without regard to the form or content of such data, and including but not limited to audio, video, audio/video, text, images, animations, databases, broadcasts, displays (including but not limited to video displays), web pages and streaming media. As media is received on processing device 101, analytics software residing on processing device 101 collects information relating to media data received from content source 125, and additionally may collect data relating to network 110.

Data relating to the media data may include a "cookie", also known as an HTTP cookie, which can provide state information (memory of previous events) from a user's browser and return the state information to a collecting site, which may be the content source 125 or collection site 121 (or both). The state information can be used for identification of a user session, authentication, user's preferences, shopping cart contents, or anything else that can be accomplished through storing text data on the user's computer. When setting a cookie, transfer of content such as Web pages follows the HyperText Transfer Protocol (HTTP). Regardless of cookies, browsers request a page from web servers by sending a HTTP request. The server replies by sending the requested page preceded by a similar packet of text, called "HTTP response". This packet may contain lines requesting the browser to store cookies. The server sends lines of Set-Cookie only if the server wishes the browser to store cookies. Set-Cookie is a directive for the browser to store the cookie and send it back in future requests to the server (subject to expiration time or other cookie attributes), if the browser supports cookies and cookies are enabled. The value of a cookie can be modified by sending a new Set-Cookie: name=newvalue line in response of a page request. The browser then replaces the old value with the new one. Cookies can also be set by JavaScript or similar scripts running within the browser. In JavaScript, the object document.cookie is used for this purpose.

Various cookie attributes can be used: a cookie domain, a path, expiration time or maximum age, "secure" flag and "HTTPOnly" flag. Cookie attributes may be used by browsers to determine when to delete a cookie, block a cookie or whether to send a cookie (name-value pair) to the collection site 121 or content site 125. With regard to specific "cookies", a session cookie may be used, which typically only lasts for the duration of users using the website. A web browser normally deletes session cookies when it quits. A session cookie is created when no expires directive is provided when the cookie is created. In another embodiment, a persistent cookie (or "tracking cookie", "in-memory cookie") may be used, which may outlast user sessions. If a persistent cookie has its Max-Age set to 1 year, then, within the year, the initial value set in that cookie would be sent back to a server every time a user visited that server. This could be used to record information such as how the user initially came to the website. Also, a secure cookie may be used when a browser is visiting a server via HTTPS, ensuring that the cookie is always encrypted when transmitting from client to server. An HTTPOnly may also be used. On a supported browser, an HTTPOnly session cookie may be used for communicating HTTP (or HTTPS) requests, thus restricting access from other, non-HTTP APIs (such as JavaScript). This feature may be advantageously applied to session-management cookies.

Referring back to the example of FIG. 1, media data is received on processing device 101. At the time the media data is received, portable computing devices 102-104 are in the vicinity, and are configured to establish Bluetooth communication ("pair") with processing device 101. After Bluetooth communications are established, processing device 101 collects the Bluetooth signal characteristics from each portable computing device. Under a preferred embodiment, Bluetooth signal characteristics relate to status parameters of a Bluetooth connection together with any other signal strength values made available in Bluetooth Core Specification. The Host Controller Interface (HCI) (discussed in greater detail below) provides access to three such connection status parameters, including Link Quality (LQ), Received Signal Strength Indicator (RSSI), and Transmit Power Level (TPL). All these status parameters require the establishment of an active Bluetooth connection in order to be measured. Another signal parameter, referred to as "Inquiry Result with RSSI", alternately also be used, where the parameter perceives RSSI from the responses sent by its nearby devices.

Briefly, Link Quality (LQ) is an 8-bit unsigned integer that evaluates the perceived link quality at the receiver. It ranges from 0 to 255, where the larger the value, the better the link's state. For most Bluetooth modules, it is derived from the average bit error rate (BER) seen at the receiver, and is constantly updated as packets are received. Received Signal Strength Indicator (RSSI) is an 8-bit signed integer that denotes received (RX) power levels and may further denote if the level is within or above/below the Golden Receiver Power Range (GRPR), which is regarded as the ideal RX power range. As a simplified example, when multipath propagation is present, RSSI is generally based on a line-of-sight (LOS) field strength and a reflected signal strength, where the overall strength is proportional to the magnitude of the electromagnetic wave's E•field. Thus, when there is minimal reflective interference, RSSI may be determined by 20 log (LOS+RS), where LOS is the line-of-sight signal strength and RS is the reflected signal. When reflective interference is introduced RSSI becomes 20 log (LOS−RS).

Transmit Power Level (TPL) is an 8-bit signed integer which specifies the Bluetooth module's transmit power level (in dBm). Although there are instances when a transmitter will use its device-specific default power setting to instigate or answer inquiries, its TPL may vary during a connection due to possible power control. "Inquiry Result with RSSI" works in a similar manner as a typical inquiry. In addition to the other parameters (e.g., Bluetooth device address, clock offset) generally retrieved by a normal inquiry, it also provides the RSSI value. Since it requires no active connection, the radio layer simply monitors the RX power level of the current inquiry response from a nearby device, and infers the corresponding RSSI.

For system 100, transmission may occur from direct voltage controlled oscillator (VCO) modulation to IQ mixing at the final radio frequency (RF). In the receiver, a conventional frequency discriminator or IQ down-conversion combined with analog-to-digital conversion is used. The Bluetooth configuration for each of the portable computing devices 102-104 and processing device 101 include a radio unit, a baseband link control unit, and link management software. Higher-level software utilities focusing on interoperability features and functionality are included as well. Enhanced Data Rate (EDR) functionalities may also be used to incorporate phase shift keying (PSK) modulation scheme to achieve a data rate of 2 or 3 Mb/s. It allows greater possibilities for using multiple devices on the same connection because of the increased bandwidth. Due to EDR having a reduced duty cycle, there is lower power consumption compared to a standard Bluetooth link.

As mentioned above, processing device 101 collects the Bluetooth signal characteristics from each portable computing device (102-104). At the same time, processing device 101 is equipped with software allowing it to measure media data exposure for a given period of time (e.g., a web browsing session) to produce research data. The term "research data" as used herein means data comprising (1) data concerning usage of media data, (2) data concerning exposure to media data, and/or (3) market research data. Under a preferred embodiment, when processing device 101 detects media data activity, it triggers a timer task to run for a predetermined period of time (e.g., X minutes) until the activity is over. At this time, discovery of paired devices is performed to locate each of the paired devices. Preferably, the UIDs of each device is known in advance. For each device discovered and paired, processing device 101 records each Bluetooth signal characteristic for the connection until the end of the session. Afterwards, the signal characteristics collected for each device, and the resultant research data for the session is forwarded to collection server 121 for further processing and/or analysis. Collection server 121 may further be communicatively coupled to server 120 which may be configured to provide further processing and/or analysis, generate reports, provide content back to processing device 101, and other functions. Of course, these functions can readily be incorporated into collection server 121, depending on the needs and requirements of the designer.

Continuing with the example of FIG. 1, portable computing devices 102 and 103 are illustrated as being paired and connected to processing device 101 during a media session. Being connected, the Bluetooth signal characteristics of portable computing devices 102 and 103 are collected (LQ, RSSI, TPL). Device 103 has previously been paired with processing device 101, but is outside the communication range of processing device 101, and therefore is unable to connect. Depending on the characteristic used, the portable computing device (102, 102) with the best characteristic is registered as being in closest proximity to processing device 101, and the portable device's user credited as being exposed to the media data.

Accordingly, if RSSI signal strength is used, the average RSSI values would be collected for each device or distinct MAC, and proximity would be detected. The strongest average RSSI value throughout the session would determine the device having closest proximity (device 102). Under another embodiment, the collected averaged RSSI values may be compared with averages from learned values to determine the nearest device. An average distance could be calculated using the distance between each device RSSI value and the learned values for each device. In this example, multiple samples would be taken (x1, x2, x3, x4, x5), where learned values contain multiple tuples for each device; each tuple would contain a corresponding number of learned RSSI values (x1', x2', x3', x4' x5'). For each tuple, the average distance would be calculated according to $$\sqrt{(x1'-x1)^2+(x2'-x2)^2+(x3'-x3)^2+(x4'-x4)^2+(x5'-x5)^2}$$

Under another embodiment, multiple Bluetooth signal characteristics (e.g., LQ and RSSI) may be processed for determining proximity.

Figure 2:
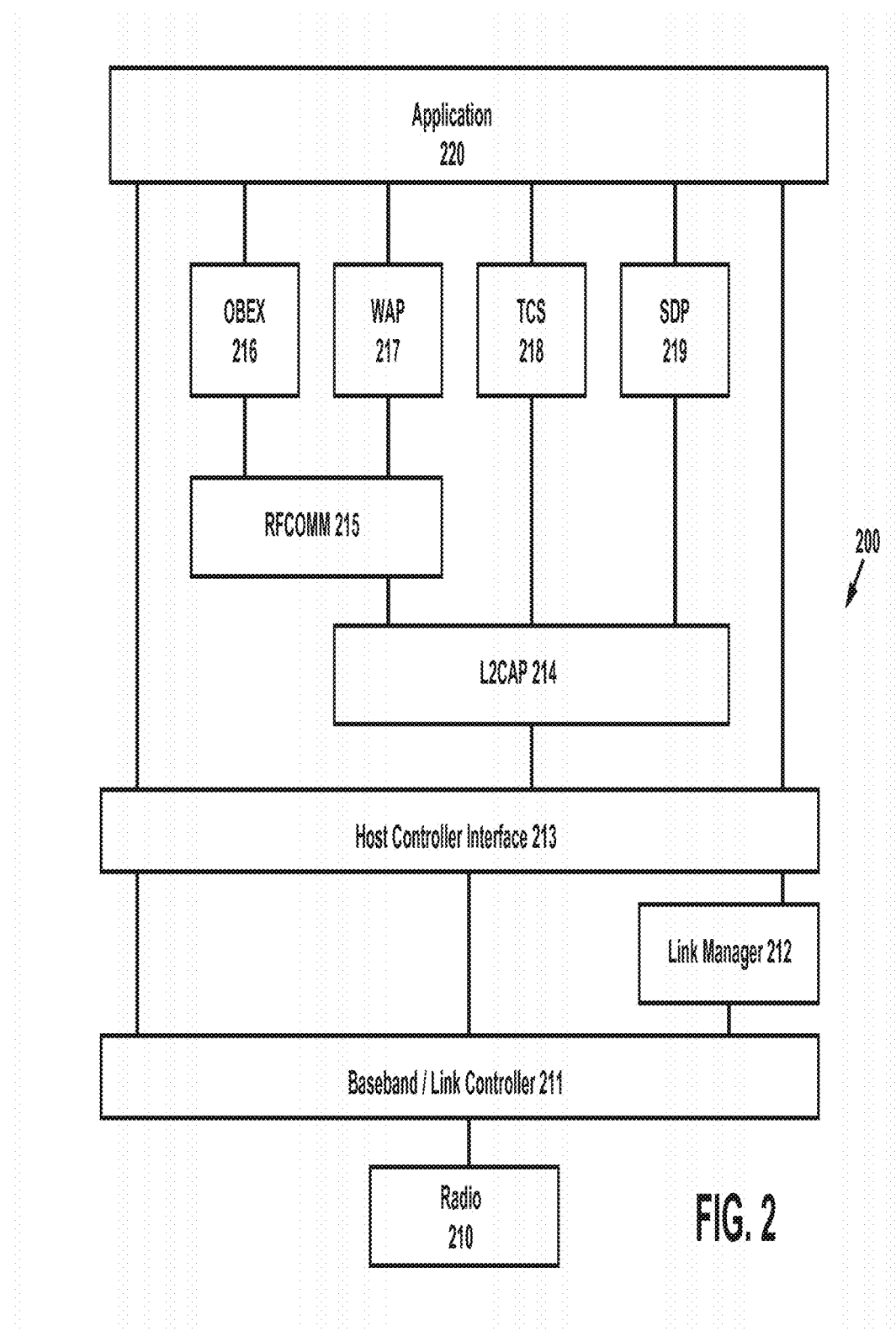
FIG. 2 illustrates an exemplary Bluetooth protocol stack utilized for communication in the embodiment of FIG. 1.

FIG. 2 shows an exemplary Bluetooth protocol stack utilized for communication in the embodiment of FIG. 1. Generally, the transition from implementation in hardware and firmware (lower layers) to software (higher layers). If each of these groups of layers are separate entities, such as a PC card and laptop computer, then they can communicate with each other through Host Controller Interface 213 (HCI), which provides paths for data, audio, and control signals between the Bluetooth module and host.

Radio 210 completes the physical layer by providing a transmitter and receiver for two-way communication. Data packets are assembled and fed to the radio 210 by the baseband/link controller 211. The link controller of 211 provides more complex state operations, such as the standby, connect, and low-power modes. The baseband and link controller functions are combined into one layer to be consistent with their treatment in the Bluetooth Specification. Link manager 212 provides link control and configuration through a low-level language called the link manager protocol (LMP).

Logical link control and adaptation protocol (L2CAP) 214 establishes virtual channels between hosts that can keep track of several simultaneous sessions such as multiple file transfers. L2CAP 214 also takes application data and breaks it into Bluetooth-size portions for transmission, and reverses the process for received data. Radio Frequency Communication (RFCOMM) 215 is a Bluetooth serial port emulator, and its main purpose is to "trick" application 220 into thinking that a wired serial port exists instead of an RF link. Finally, various software programs that are needed for different Bluetooth usage models enable resident application 220 to use Bluetooth. These include service discovery protocol (SDP) 219, object exchange (OBEX), 216 telephony control protocol specification (TCS) 218, and Wireless Application Protocol (WAP) 217. Bluetooth radio 210 and baseband I link controller 211 consist of hardware that is typically available as one or two integrated circuits. Firmware-based link manager 212 and one end of the host controller interface 213, perhaps with a bus driver for connection to the host, complete the Bluetooth module shown in FIG. 2. The remaining parts of tile protocol stack and the host end of HCI 213 can be implemented in software on the host itself.

Figure 3:
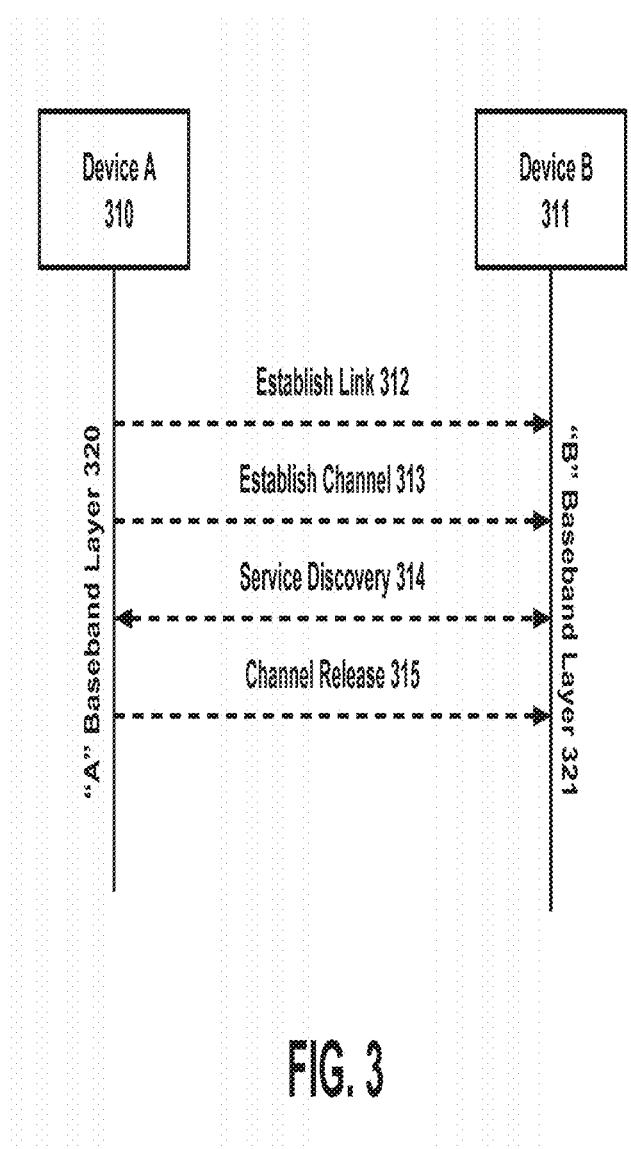
FIG. 3 illustrates an exemplary service discovery process.

FIG. 3 illustrates an exemplary Bluetooth discovery process utilizing "Device A" 310 and "Device B" 311 using each respective baseband layer (320, 321). Here, Device A 310 is initiating service discover while Device B 311 establishes communications in order to make it discoverable. The process may be assisted using a service discovery application from an access profile stored in each device.

The initial linking process 312 begins with an inquiry and page among devices in order to establish a piconet. In FIG. 3, Device A 310 is configured as a prospective slave (p-slave) and Device B 311 is a prospective master (p-master). As a p-master, Device B 311 must send its frequency hop synchronization (FHS) packet to a Device A 310 so the latter can use the same hop sequence and phase used by the master. Preferably, a predetermined hop sequence or set of sequences, are used for paging and inquiries. For inquiries, the p-master may not know about nearby devices, so a single common hop sequence (one sequence for sending an inquiry and another for responding to the inquiry) is used by all devices for initial device discovery. A p-slave responding to an inquiry sends its FHS packet, within which is its Bluetooth device address (BD_ADDR). Now the p-master can create a new hopping sequence based the BD_ADDR for transmitting a subsequent page for establishing a piconet with that p-slave.

Inquiries that are sent and replied by a device are typically transmitted at a device-specific default power setting. As a result, signal characteristics, such RSSI collected through an inquiry is relatively free from the side-effect of power control. Accordingly, a inquiry fetched RSSI may provide finer measurements than the connection-based RSSI.

For establishing channel 313, a hop channel set and the sequence of hops through the channel set may be determined by the lower 28 bits of a device's BD_ADDR, and the hop phase may be determined by the 27 most significant bits of CLK. These two values are sent to a hop generator, and the output of this generator goes to the Bluetooth radio's frequency synthesizer. In order to establish communications, Devices A and B should use the same hop channels, the same hop sequence from channel to channel, and the same phase so that they hop together. Also, one device should transmit while the other receives on the same frequency and vice versa. Multiple hop sequences and periods are configured to cover inquiry, page, and connect activity. These include channel hop sequence (used for normal piconet communications between master and slave(s)), page hop sequence (used by a p-master to send a page to a specific p-slave and to respond to the slave's reply), page response sequence (used by a p-slave to respond to a p-master's page), inquiry hop sequence (used by a p-master to send an inquiry to find Bluetooth devices in range), and inquiry response sequence (used by a p-slave to respond to a p-master's inquiry).

Service discovery 314 is used for retrieving information required to set up a transport service or usage scenario, and may also be used to access a device and retrieve its capabilities or to access a specific application and find devices that support that application. Retrieving capabilities requires paging a device and forming an Asynchronous Connectionless Link (ACL) to retrieve the desired information, accessing applications involves connecting to and retrieving information from several devices that are discovered via an inquiry. Thus, service discovery may be used for browsing for services on a particular device, searching for and discovering services based upon desired attributes, and/or incrementally searching a device's service list to limit the amount of data to be exchanged. An L2CAP channel with a protocol service multiplexer (PSM) is used for the exchange of service-related information. Service discovery can have both client and server implementations, with at most one service discovery server on any one device. However, if a device is client only, then it need not have a service discovery server. Each service is preferably listed in the device's SOP database as a service record having a unique ServiceRecordHandle, and each attribute of the service record is given an attribute ID and an attribute value. Attributes include the various classes, descriptors, and names associated with the service record. After service discovery is completed, the channel is released 315.

Figure 4:
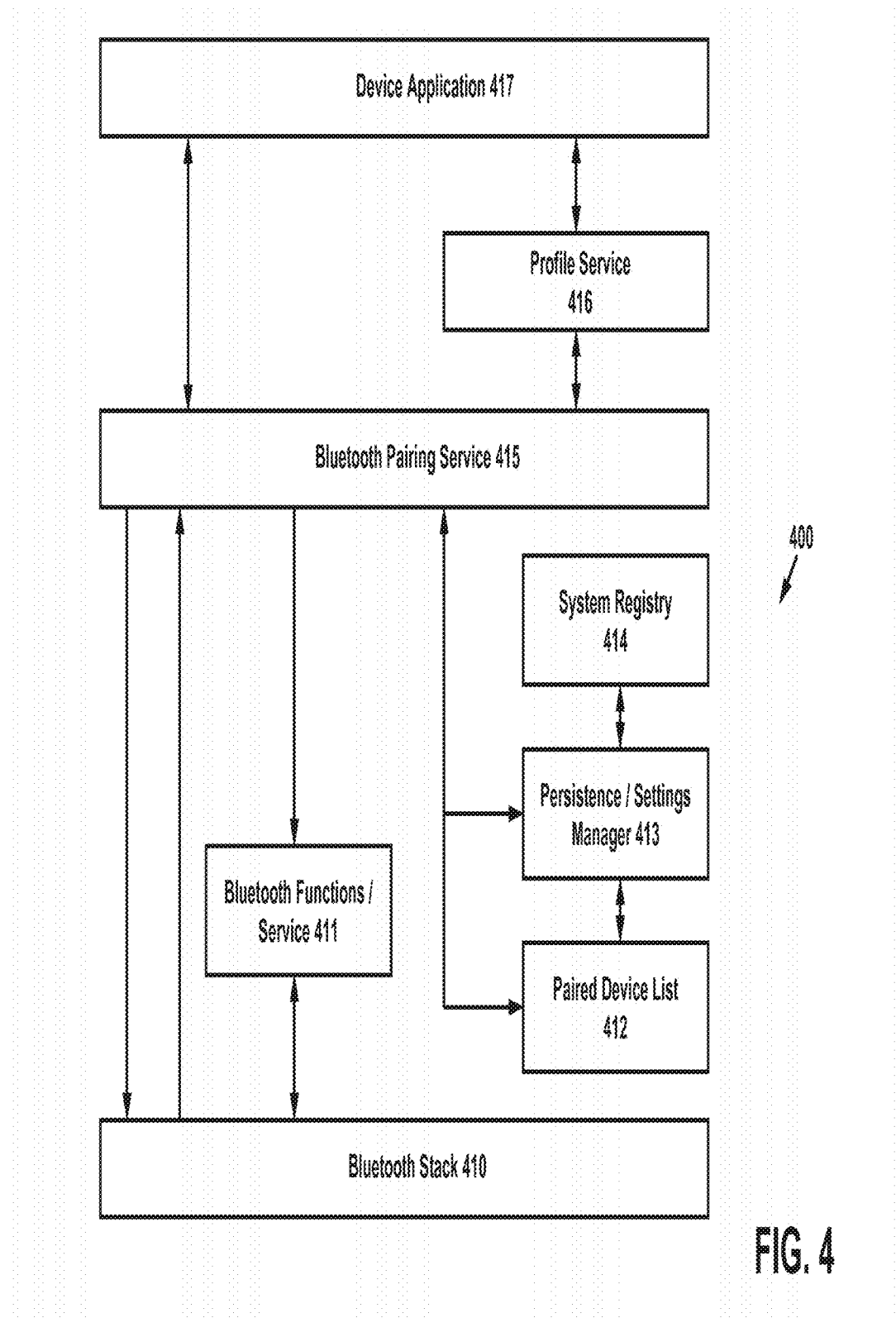
FIG. 4 illustrates an exemplary authentication mechanism for connected devices.

FIG. 4 illustrates an exemplary authentication configuration 400, where Bluetooth Pairing Service 415 sends API calls to Bluetooth Stack 410 and receives back pairing events. Bluetooth Stack 410 transmits API calls to Bluetooth helper service/function 411, which receives discovery enable signals (inquiry, page scan) from Bluetooth Pairing Service 415. Bluetooth pairing information for Pairing Service 415 is communicated from persistence/settings manager 413 and paired device list 412, which preferably retries information from system registry 414. Bluetooth Pairing Service 415 forwards information to device application 417, and may further retrieve and communicate profile services 416 to application 417 as well.

The authentication process verifies the identity of the device at the other end of a link. The verifier queries the claimant and checks its response; if correct, then authentication is successful. Authorization can be used to grant access to all services, a subset of services, or to some services when authentication is successful, but requires additional authentication based on some user input at the client device for further services. The last item is usually implemented at the application layer. For Bluetooth Pairing Services 415, two devices become paired when they start with the same PIN and generate the same link key, and then use this key for authenticating at least a current communication session. The session can exist for the life of a L2CAP link (for Mode 2 security) or the life of the ACL link (for Mode 3 security). Pairing can occur through an automatic authentication process if both devices already have the same stored PIN from which they can derive the same link keys for authentication. Alternatively, either or both applications can ask their respective users for manual PIN entry. Once devices are paired they can either store their link keys for use in subsequent authentications or discard them and repeat the pairing process each time they connect. If the link keys are stored, then the devices are "bonded," enabling future authentications to occur using the same link keys and without requiring the user to input the PIN again. The concept of "trust" applies to a device's authorization to access certain services on another device. A trusted device is previously authenticated and, based upon that authentication, has authorization to access various services. An untrusted device may be authenticated, but further action is needed, such as user intervention with a password, before authorization is granted to access services. Also, encryption may be used to further enhance security of connections.

Figure 5:
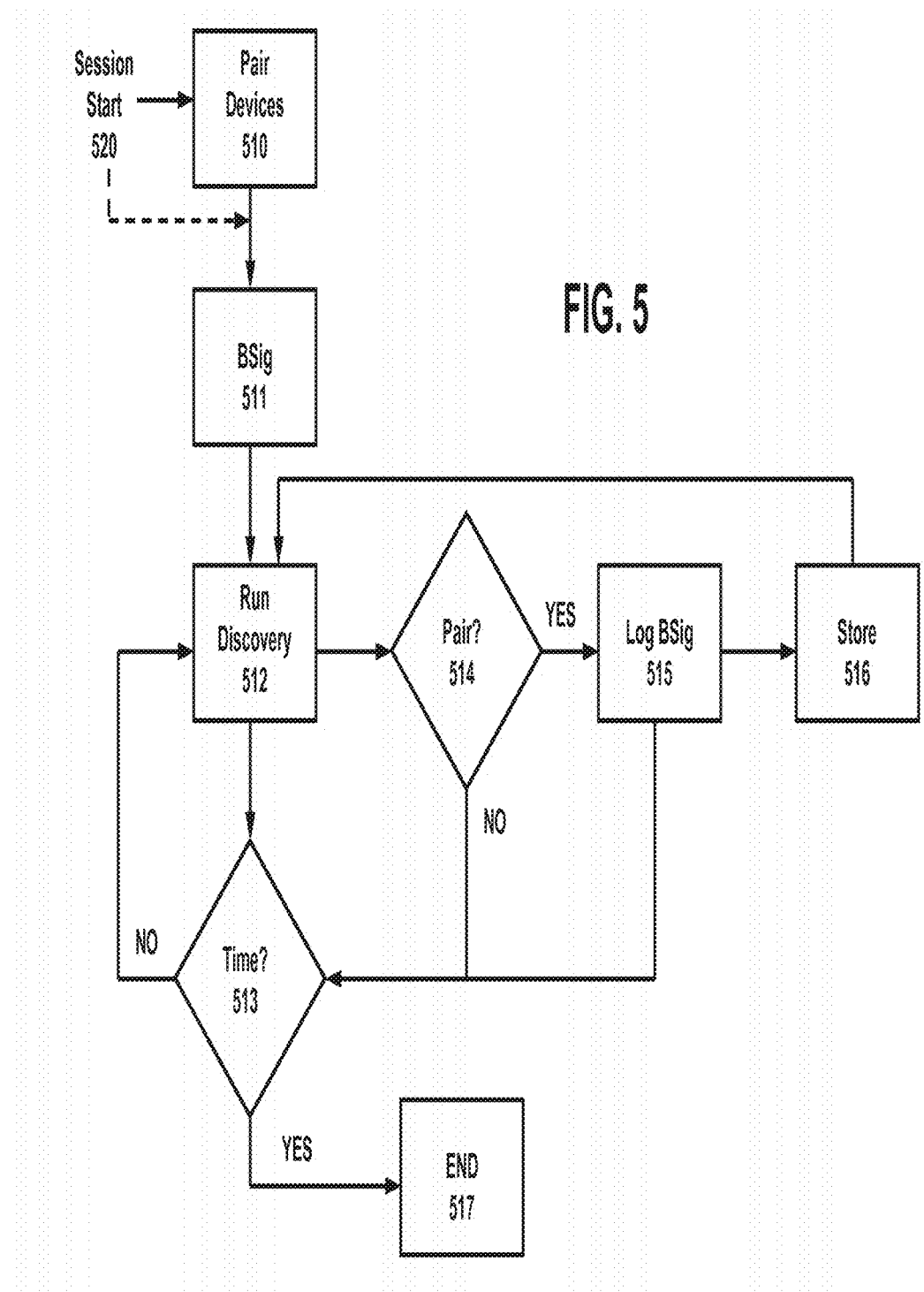
FIG. 5 is an exemplary flowchart for monitoring an RSSI Bluetooth signal characteristic.

FIG. 5 discloses one exemplary process for linking exposure to media data utilizing Bluetooth signal characteristics described above. In the beginning, a web session 520 starts, which triggers Bluetooth pairing of nearby devices 510. Once paired, the Bluetooth signal characteristics 511 ("BSig") are initially received. In the event that devices are already paired and/or bonded, the process starts by acquiring Bluetooth signal characteristics 511. Afterwards, a discovery process is run 512 for retrieving information for transport service or usage scenario, and may also be used to access a device and retrieve its capabilities or to access a specific application and find devices that support that application. Under one embodiment, a timer is used for media data exposure, wherein the timer can be set for specific time periods, or may alternately be set and used to correspond with web sessions or other events. When the timer 513 runs out, the process ends in 517. Otherwise, the process moves to 514, where the pairing is validated to ensure that a Bluetooth device is not moving out of range or otherwise compromising the connection. If the pairing validation produces a negative result, the process continues to look for the device via 512 for the time period 513. If the pairing validation is affirmative, the Bluetooth signal characteristics are logged 515 and stored 516 for the duration of the measurement (513). It should be understood that BSig block 515 may include Received Signal Strength Indicator (RSSI) value, a Transmit Power Level (TPL) value and/or a Link Quality (LQ) value.

It is understood that the examples above are provided as examples, and are not intended to be limiting in any way. Under an alternate embodiment, Bluetooth signal strengths may be approximated to determine distance. As explained above, an RSSI value provides the distance between the received signal strength and an optimal receiver power rank referred to as the "golden receiver power rank." The golden receiver power rank is limited by two thresholds. The lower threshold may be defined by an offset of 6 dB to the actual sensitivity of the receiver. The maximum of this value is predefined by −56 dBm. The upper threshold may be 20 dB over the lower one, where the accuracy of the upper threshold is about ±6 dB. Where S is assigned as the received signal strength, the value of S is determined by: (1) $S=RSSI+T_U$, for RSSI>0 and (2) $S=RSSI-T_L$, for RSSI<0, where $T_U=T_L+20$ DdB. Here, $T_U$ refers to the upper threshold, and $T_L$ refers to the lower threshold. The definition of the Bluetooth golden receiver limits the measurement of the RSSI to a distance. In order to measure the most unique characteristics of the signal, only measurements that result in a positive range of the RSSI should be considered for a functional approximation. The approximation may be calculated by choosing the best fitted function given by determining and minimizing the parameters of a least square sum of the signal strength measurements.

With regard to media data exposure measurement, the preferred embodiment collects research data on a computer processing device, associates it with the collected Bluetooth signal characteristics, and (a) transmits the research data and Bluetooth signal characteristics to a remote server(s) (e.g., collection server 121) for processing, (b) performs processing of the research data and Bluetooth signal characteristics in the computer processing device itself and communicates the results to the remote server(s), or (c) distributes association/processing of the research data and Bluetooth signal characteristics between the computer processing device and the remote server(s).

Under another embodiment, one or more remote servers are responsible for collecting research data on media data exposure. When Bluetooth signal characteristics are received from a computer processing device, the signal characteristics are associated with the research data (e.g., using time stamps) and processed. This embodiment is particularly advantageous when remote media data exposure techniques are used to produce research data. One technique, referred to as "logfile analysis," reads the logfiles in which a web server records all its transactions. A second technique, referred to as "page tagging," uses JavaScript on each page to notify a third-party server when a page is rendered by a web browser. Both collect data that can be processed to produce web traffic reports together with the Bluetooth signal characteristics. In certain cases, collecting web site data using a third-party data collection server (or even an in-house data collection server) requires an additional DNS look-up by the user's computer to determine the IP address of the collection server. As an alternative to logfile analysis and page tagging, "call backs" to the server from the rendered page may be used to produce research data. In this case, when the page is rendered on the web browser, a piece of Ajax code calls to the server (XMLHttpRequest) and passes information about the client that can then be aggregated.

Turning to FIG. 6, an exemplary portion of a report utilizing Bluetooth signal characteristics is illustrated, where five different kinds of media data (Media1-Media5) were received on a computer processing device (COMP1). At that time, four portable computing devices (Device 1-Device 4) were either (a) previously paired with the computing device, or actively paired with the computing device during the media session in which the five media data were received. The body of the table in FIG. 6 is populated with the collected signal strengths (e.g., average RSSI) for each device. It this example, Device 1 had either a minimal connection (020) or no connection at all (000) throughout the session, and was therefore not credited with being exposed to any of the media data. Device 2 was measured as having the strongest signal strength for Media1 and Media 5 (0127 and 124, respectively), and was therefore credited with being exposed to the media data. While Device 2 was measured as being in proximity to computer processing device for Media2 and Media3, Device 3 was measured as having the strongest signal strength (100 and 110), and thus Device 3 received credit with being exposed to media data. Similarly, Device 4 was measured as having the strongest signal strength at the time Media4 was received, and thus receives the media exposure credit. Under one embodiment, threshold media strength can be implemented to reduce the possibility of "false positives" in crediting media exposure. In this example, if three devices are detected in a vicinity of a portable computing device, but the signal strengths are not sufficiently high enough, none of the devices are credited with being exposed to the media data.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A method to collect media exposure data, comprising:
   collecting a cookie at a client device based on media accessed via a web page at the client device;
   selecting a portable device identifier at the client device, the portable device identifier corresponding to a closest one of a plurality of portable devices in wireless communication with the client device, the portable device identifier associated with a particular person; and
   in response to instructions embedded in the media, sending a hypertext transfer protocol (HTTP) request to a server, the HTTP request including the cookie, the portable device identifier, and information identifying exposure to the media.

2. A method as defined in claim 1, further comprising identifying the closest one of the portable devices by:
   collecting signal characteristics corresponding to the wireless communication between the portable devices and the client device; and selecting the closest one of the portable devices based on one of the signal characteristics being comparatively best relative to the other signal characteristics.

3. A method as defined in claim 2, wherein the signal characteristic is one of a link quality, a signal strength, or a transmit power level.

4. A method as defined in claim 1, wherein the wireless communication is a Bluetooth communication.

5. A method as defined in claim 1, wherein the cookie, the portable device identifier, and the information identifying exposure to the media cause the server to credit the particular person with being exposed to the media.

6. A method as defined in claim 1, wherein the media is at least one of audio, video, text, an image, an animation, a database, a web page, broadcast media, or streaming media.

7. A method as defined in claim 1, further comprising, in response to detecting that the media is accessed at the client device:
establishing the wireless communications between the client device and the plurality of portable devices; and
obtaining signal characteristics corresponding to the wireless communications of the portable devices, the signal characteristics to facilitate the selecting of the portable device identifier at the client device.

8. An apparatus to collect media exposure data, comprising:
a processor; and
a storage memory comprising computer readable instructions that, when executed, cause the processor to:
collect a cookie at a client device based on media accessed via a web page at the client device;
select a portable device identifier at the client device, the portable device identifier corresponding to a closest one of a plurality of portable devices in wireless communication with the client device, the portable device identifier associated with a particular person; and
in response to instructions embedded in the media, send a hypertext transfer protocol (HTTP) request to a server, the HTTP request including the cookie, the portable device identifier, and information identifying exposure to the media.

9. An apparatus as defined in claim 8, wherein the computer readable instructions, when executed, further cause the processor to:
collect signal characteristics corresponding to the wireless communication between the portable devices and the client device; and
select the closest one of the portable devices based on one of the signal characteristics being comparatively best relative to the other signal characteristics.

10. An apparatus as defined in claim 9, wherein the signal characteristic is one of a link quality, a signal strength, or a transmit power level.

11. An apparatus as defined in claim 8, wherein the wireless communication is a Bluetooth communication.

12. An apparatus as defined in claim 8, wherein the cookie, the portable device identifier, and the information identifying exposure to the media cause the server to credit the particular person with being exposed to the media.

13. An apparatus as defined in claim 8, wherein the media is at least one of audio, video, text, an image, an animation, a database, a web page, broadcast media, or streaming media.

14. An apparatus as defined in claim 8, wherein the computer readable instructions, when executed, further cause the processor to:
establish the wireless communications between the client device and the plurality of portable devices; and
obtain signal characteristics corresponding to the wireless communications of the portable devices, the signal characteristics to facilitate the selecting of the portable device identifier at the client device.

15. A computer readable storage device or storage disk comprising computer readable instructions that, when executed, cause a processor to at least:
collect a cookie at a client device based on media accessed via a web page at the client device;
select a portable device identifier at the client device, the portable device identifier corresponding to a closest one of a plurality of portable devices in wireless communication with the client device, the portable device identifier associated with a particular person; and
in response to instructions embedded in the media, send a hypertext transfer protocol (HTTP) request to a server, the HTTP request including the cookie, the portable device identifier, and information identifying exposure to the media.

16. A computer readable storage device or storage disk as defined in claim 15, wherein the computer readable instructions, when executed, cause the processor to:
collect signal characteristics corresponding to the wireless communication between the portable devices and the client device; and
select the closest one of the portable devices based on one of the signal characteristics being comparatively best relative to the other signal characteristics.

17. A computer readable storage device or storage disk as defined in claim 16, wherein the signal characteristic is one of a link quality, a signal strength, or a transmit power level.

18. A computer readable storage device or storage disk as defined in claim 15, wherein the wireless communication is a Bluetooth communication.

19. A computer readable storage device or storage disk as defined in claim 15, wherein the cookie, the portable device identifier, and the information identifying exposure to the media cause the server to credit the particular person with being exposed to the media.

20. A computer readable storage device or storage disk as defined in claim 15, wherein the media is at least one of audio, video, text, an image, an animation, a database, a web page, broadcast media, or streaming media.

21. A computer readable storage device or storage disk as defined in claim 15, wherein the computer readable instructions, when executed, cause the processor to:
establish the wireless communications between the client device and the plurality of portable devices; and
obtain signal characteristics corresponding to the wireless communications of the portable devices, the signal characteristics to facilitate the selecting of the portable device identifier at the client device.

* * * * *